Patented Nov. 29, 1938

2,138,762

UNITED STATES PATENT OFFICE 2,138,762

PROCESS OF POLYMERIZING METHACRYLIC ESTERS OF AMINO ALCOHOLS, IN WHICH THE AMINO GROUP IS TERTIARY, AND PRODUCT

Jesse Harmon, Wilmington, Del., assignor to E. I. du Pont de Nemours & Company, Wilmington, Del., a corporation of Delaware No Drawing. Application May 16, 1935, Serial No. 21,810

20 Claims. (Cl. 260—2)

The present invention relates to a process for the polymerization of amino alcohol esters of acrylic and alpha substituted acrylic acids and more particularly to the polymerization in an aqueous solution of the salts of the methacrylic acid esters of the amino alcohols in which the amino group is tertiary, such, for example, as beta-diethylaminoethyl methacrylate hydrochloride, etc. The invention also relates to the products obtained. The term "amino alcohol", when used herein, will refer to the amino alcohols in which the amino nitrogen is tertiary.

The preparation and properties of the amino alcohol esters of alpha substituted acrylic acids are disclosed in the copending application of G. D. Graves, Serial No. 21,807, filed May 16, 1935. It has been found that these esters as well as the corresponding esters of acrylic acid can be polymerized by subjecting them to heat with or without pressure in the presence or absence of a suitable polymerization catalyst. When so polymerized, however, many of the resins have but limited solubility in common oxygenated organic solvents and consequently their use in the arts is thereby more or less limited.

An object of the present invention is to provide a new and improved polymerization process. A further object of the present invention is to provide a process for the polymerization of amino alcohol esters of the acrylic and of alpha substituted acrylic acids, whereby resins are obtained having new and improved solubility characteristics. Another object is to provide a process for producing acid soluble polymers of amino alcohol esters of acrylic and of alpha substituted acrylic acids. Still another object is to provide an improved polymerization process wherein amino alcohol esters of acrylic and of alpha substituted acrylic acids are prepared by converting the ester to a salt, subsequently polymerizing the resulting salt and finally converting the thus polymerized salt to the free base. Yet another object includes the products resulting from these processes. Other objects and advantages of the invention will hereinafter appear.

The above objects are attained in accord with this invention by treating the monomeric amino alcohol ester of acrylic acid or of the alpha substituted acrylic acid with a stoichiometric equivalent amount of an acid, the salt thus formed then being dissolved in water or other suitable solvent and the resulting solution subjected to polymerizing conditions in the presence or absence of polymerization catalysts. The polymerization may be conducted by allowing the solution to stand at room temperature, by heat treatment or by exposure to ultraviolet light, polymerization catalysts may also be present, if desired. A preferred process involves heating a 5–30%, and preferably a 10%, aqueous solution of the monomeric salt at approximately 100° C., and in the presence of about 1% benzoyl peroxide, based upon the amount of monomer used.

It has been found that by increasing the amount of the dissolved salt of the monomeric ester up to certain limits depending on the particular ester used, a higher molecular weight polymer may be obtained. Generally speaking, the polymerization requires in the neighborhood of 24 hours. The solid material present, which results from the benzoyl peroxide, is filtered off and the solution of the salt of the polymer may be used as such or the free polymeric base can be obtained if desired by the addition of alkalies, preferably by adding an excess of sodium bicarbonate solution over the amount required to neutralize the acid and thereafter heating to liberate carbon dioxide.

Several examples for the polymerization of various amino alcohol esters of acrylic acid and of alpha substituted acrylic acids will be given by way of illustration, but it will be understood that the present invention will not be limited thereby except as indicated in the claims appended hereto.

*Example 1.*—Beta-dimethylaminoethyl methacrylate: A. Synthesis of monomer: A solution of 89 grams (1 mol) of beta-dimethylaminoethanol and 400 grams (4 mols) of methyl methacrylate in 500 grams of dry benzene containing 30 grams of para-phenylenediamine is made up, heated in an oil bath under a 48" fractionating column fitted with a distilling head arranged for controlled reflux, and distilled under the moisture present in the reagents is removed. As soon as all the water is off, a solution of 2 grams of metallic sodium in 20 cc. of dry methanol is added dropwise to the refluxing reaction mixture during the course of 6 hours, during which time a benzene-methanol binary (boiling point 58° C.) is collected at the head of the column. The distillation and collection of binary is continued until no more methanol is liberated, whereupon the reaction mixture is allowed to cool, filtered, and the excess methyl methacrylate removed by fractional distillation under reduced pressure through a long column, and the product distilled through a short column under reduced pressure in an atmosphere of nitrogen. The yield of product boiling at 62-65° C. at 6 mm. pressure is 59% of the theoretical, and analyzes 8.2% nitrogen, whereas the calculated value for beta-dimethylaminoethyl methacrylate is 8.9%.

B. Polymerization of the monomer: Polymerization is effected by dissolving the monomer in an equivalent amount of dilute acetic acid, diluting with water to 10% monomer concentration, adding powdered benzoyl peroxide (1% based on the monomer), and heating at 100° C. for 21 hours. The viscous polymeric salt solution obtained is diluted to 1.5% resin concentration, the solution poured into five times its volume of acetone, and the polymeric salt that precipitates, filtered, and dried, is obtained as a white, water-soluble powder. The polymeric free base may be obtained by heating the polymeric salt at about 100° C. The product thus obtained is soluble in water, alcohol, acetone, etc., whereas the polymeric free base obtained by spontaneous polymerization of monomer at room temperature without catalyst is insoluble in common organic solvents.

Baked films of the polymeric salt are hard, almost colorless, and are softened but not dissolved by water.

*Example 2.*—Beta-diethylaminoethyl methacrylate: A. Synthesis of the monomer: This compound is made in the same manner as the product of Example 1, except that a solution of 117 grams (1 mol) of beta-diethylaminoethanol and 400 grams (4 mols) of methyl methacrylate dissolved in 500 grams of dry benzene containing 30 grams of para-phenylenediamine is used. Beta-diethylaminoethyl methacrylate is isolated by collecting the fraction boiling at 85°±5° C. at 5 mm. pressure, carefully washing eight times with cold water to remove traces of para-phenylenediamine, drying with anhydrous magnesium sulphate, filtering, washing the drying agent with ether, combining these washings with the bulk of the product, and then removing the ether by vacuum distillation under a fractionating column. The yield of slightly amber colored residual product amounts to 68-72% of the theoretical.

B. Polymerization of the monomer: Polymerization is effected by adding an equivalent amount of aqueous acetic acid to a weighed sample of the monomer, warming to dissolve the monomer, diluting with water to 10% monomer concentration, adding powdered benzoyl peroxide (1% based on the monomer), and heating at 100° C. for 24 hours; films of the polymeric acetate baked at 100° C. for a few hours are tough, transparent, almost colorless, and water insoluble.

Entirely analogous results are obtained in the above example if instead of acetic acid such acids as acrylic, methacrylic, formic, glycollic, etc., are used.

Ethyl alcohol may be used in place of water as the polymerizing medium in the above example with entirely analogous results.

The free base resin can be precipitated from the aqueous salt solution by adding thereto an equivalent amount of sodium bicarbonate solution and heating to liberate carbon dioxide. The free base resin is soluble in methanol, ethanol, acetone, and in dilute hydrochloric or acetic acids, and is compatible with nitrocellulose and ethyl cellulose, and with oil modified polyhydric alcohol-polycarboxylic acid resins. It is white, tough, flexible, and slightly elastic. Upon continued baking at 100° C. the free base polymer becomes hard, somewhat brittle, and decreases in solubility both in acids and organic solvents.

*Example 3.* — Beta-dicyclohexylaminoethyl methacrylate: A. Beta-dicyclohexylamino ethanol: 80 grams (1 mol) of ethylene chlorhydrin is added during 20 minutes to 185 grams (1.02 mols) of dicyclohexylamine maintained at 90° C. The mixture is stirred and heated in an oil bath at 130-140° C. for 14 hours, at the end of which time the reaction mixture is allowed to cool, and an excess of 20% sodiumhydroxide solution added, the oil that forms is separated, washed with water, dried, and fractionally distilled in vacuo. The yield of product boiling at 156-163° C. at 6 mm. pressure is 48-50% of the theoretical. The product has a neutralization equivalent of 228.5, whereas the calculated neutralization equivalent of beta-dicyclohexylamino ethanol is 225.

B. Synthesis of monomer: Beta-dicyclohexylaminoethyl methacrylate monomer is made by ester interchange between methyl methacrylate and beta-dicyclohexylamino ethanol by the technique described under Example 1, and purified by the method described under Example 2. The yield of product boiling at 153-159° C. at 2 mm. pressure is 73% of the theoretical. Analysis of the product shows it to contain 4.87% nitrogen, whereas the theoretical nitrogen content of beta-dicyclohexylaminoethyl methacrylate is 4.8%.

C. Polymerization of monomer: Polymerization is effected by adding an equivalent amount of hydrochloric acid to a weighed sample of the monomer, warming to dissolve the monomer, diluting with water to 10% monomer concentration, adding powdered benzoyl peroxide (1% based on the monomer), and heating at 100° C. for 24 hours.

The free base polymer is recovered as an amorphous powder, from the polymeric salt solution by adding thereto an excess of sodium bicarbonate solution. The free base polymer thus obtained is soluble in benzene, toluene, mineral spirits, and in an excess of dilute hydrochloric or acetic acids, whereas free base polymer obtained by the spontaneous polymerization at or below room temperature without catalyst is insoluble in acids and organic solvents. The free base polymer obtained from the polymeric salt is compatible with oil modified polyhydric alcohol-polycarboxylic acid resins, nitrocellulose and China-wood oil.

Films flowed from solutions of the polymeric base in organic solvents or in dilute acetic acid are, after baking at 100° C. for four hours, hard, clear, tough, and have excellent water-resistance.

*Example 4.*—Beta-di-n-butylaminoethyl methacrylate: A. Synthesis of the monomer: Monomer boiling at 106-111° C. at 2 mm. pressure is synthesized in 57% yield by reacting methyl methacrylate with beta-di-n-butylamino ethanol by the procedure described in Example 1, and the product separated from traces of p-phenylenediamine by repeated washing as described in Example 2. Analysis of the product obtained shows it to contain 6.71% nitrogen, whereas the calculated amount of nitrogen in beta-di-n-butyl aminoethyl methacrylate is 5.8%.

B. Polymerization of the monomer: Polymerization is effected by adding an equivalent amount of hydrochloric acid to a weighed sample of monomer, warming to dissolve the monomer, diluting with water to 10% monomer concentration, adding powdered benzoyl peroxide (1% based on the monomer), and heating at 100° C. for 24 hours. The resulting solution of the polymeric salt has a viscosity of 0.2 poises at 25° C.

The free base polymer is obtained from the polymeric salt solution by adding thereto an excess of sodium bicarbonate solution, and heating to liberate carbon dioxide. The free base polymer is soluble in toluene and butyl acetate, whereas free base polymer obtained by the spontaneous polymerization of monomer at or below room temperature without catalyst is insoluble in organic solvents. The free base polymer obtained from the polymeric salt is compatible with nitrocellulose and with ethyl cellulose.

*Example 5.*—Triethanolamine monomethacrylate: A. Preparation of the monomer: To 75 grams (0.5 mol) of triethanol amine and 12.5 grams (0.5 mol) of sodium are added 400 cc. of dry dioxane, and the mixture refluxed until the sodium has reacted. The solution is then allowed to cool to 30° C. and 52 grams (0.5 mol) of methacrylyl chloride is added with stirring during two-thirds of an hour. Stirring is continued for an hour longer, the sodium chloride filtered off, 10 grams of hydroquinone added to the filtrate, and the dioxane removed by distillation under reduced pressure. The residual oil is dissolved in ether, the hydroquinone removed by washing with dilute sodium hydroxide solution, the ether solution dried, and the ether removed by vacuum distillation. An amber colored residual oil is obtained, which upon analysis is found to contain 6.26% nitrogen, whereas the calculated quantity of nitrogen in triethanolamine monomethacrylate is 6.45%.

B. Polymerization of the monomer: Polymerization is effected by adding an equivalent amount of acetic acid to a weighed sample of the monomer, warming to dissolve the monomer, diluting with water to 10% monomer concentration, adding powdered benzoyl peroxide (1% based on the monomer), and heating at 100° C. for 15 hours.

The free base polymer is recovered from the polymeric salt solution by adding thereto an excess of sodium bicarbonate solution, and warming to expel carbon dioxide. The free base polymer thus obtained is soluble in organic solvents and in an excess of dilute hydrochloric and acetic acids, whereas free base polymer obtained by the spontaneous polymerization of monomer at or below room temperature without caltayst is insoluble in organic solvents and dilute acids. Films from the free base polymer become insoluble upon heat-treatment at 100° C.

*Example 6.*—2-(diethylamino) cyclohexyl methacrylate. A. Synthesis of the monomer: To a solution of 35 grams (0.2 mol) of 2-(diethylamino) cyclohexanol in 150 grams of dry dioxane is added 4.6 grams (0.2 mol) of sodium and the mixture stirred and refluxed for 20 hours. The mixture is then cooled, 20.8 grams (0.2 mol) of methacrylyl chloride is added with stirring over a period of about 4 hours, and the mixture refluxed for about a half hour. The solution is then cooled, diluted with a large volume of water, an excess of sodium hydroxide solution added, the oily layer is separated, dried, and vacuum distilled. The yield of product boiling at 91–99° C. at 1 mm. pressure amounts to about 42% of the theoretical, and analysis shows it to contain 6.61% nitrogen, whereas the calculated amount of nitrogen in 2-(diethylamino) cyclohexyl methacrylate is 5.86%.

B. Polymerization of the monomer: To 13.4 grams of the monomer is added an equivalent amount of hydrochloric acid and 0.13 gram of benzoyl peroxide, the solution is diluted to 12% monomer concentration, and heated in a 100° C. oven for two days. The solution of polymer thus obtained is filtered, diluted with an equal volume of water, and the resin percipitated by addition of a slight excess of sodium hydroxide solution. The free base polymer thus obtained is a white powder, soluble in benzene and butyl acetate, and films thereof are colorless, hard and brittle, whereas free base polymer obtained by the spontaneous polymerization of monomer at or below room temperature without catalyst is insoluble in organic solvents. The free base polymer is compatible with nitrocellulose and polyhydric alcohol-polycarboxylic acid resins.

*Example 7.*—1 - (beta - methacrylyloxyethyl) - piperidine. A. Synthesis of the monomer: A solution of 2 grams of sodium in 20 cc. of methanol is added during the course of two hours to a boiling solution of 101 grams (0.784 mol) of 1-(beta-hydroxyethyl) piperidine and 314 grams (3.14 mols) of methyl methacrylate in 350 grams of dry benzene, containing 20 grams of paraphenylenediamine. The reaction flask is mounted under a 48" fractionating column and the solution fractionated for 3.5 hours during which time a benzene-methanol binary (boiling point 58° C.) is taken off at the top. After the reaction mixture has cooled, the solvent and excess methyl methacrylate are fractionated through a long column under diminished pressure, and the product finally distilled through a short column. The fraction boiling at 75–80° C. at 1 mm. pressure, which amounts to about 60% of theoretical, is collected, washed eight times with water, then diluted with ether, dried over anhydrous magnesium sulphate, and finally the ether is separated from the product by evaporation at room temperature under reduced pressure. Analysis of the material obtained shows it to contain 7.27% nitrogen, whereas the calculated amount of nitrogen in 1-(beta-methcrylyloxyethyl) piperidine is 7.1%.

Polymerization of the monomer: To 50 grams of the monomer is added 15.55 grams of 98% acetic acid, and the solution diluted with water to 10% monomer concentration. Powdered benzoyl peroxide is then added, and the mixture heated in a stoppered flask in a 100° C. oven for 7 hours. The resulting polymeric salt solution is slightly orange colored and very viscous. Films of the polymeric salt, baked at 100° C. for 4 hours, are clear, hard, almost colorless and insoluble in water.

The free base polymer is obtained from the polymeric salt by adding thereto an excess of sodium bicarbonate solution, and heating to liberate carbon dioxide. The free base polymer, after drying, is slightly orange colored, hard, brittle, insoluble in water but soluble in an excess of dilute acetic acid, ethanol, ethylene glycol monomethyl ether, etc., whereas free base polymer obtained by the spontaneous polymerization of monomer at or below room temperature without catalyst is insoluble in dilute acids and organic solvents.

*Example 8.*—Beta-diethylaminoethyl acrylate. A. Preparation of monomer: To 8 grams (0.088 mol) of acrylyl chloride and 50 cc. of dry benzene is added dropwise 11 grams (0.094 mol) of beta-diethylamino ethanol dissolved in 50 cc. of benzene, and the solution refluxed gently for about 2 hours. The hygroscopic hydrochloride of beta-diethylaminoethyl acrylate thus synthesized is purified by recrystallization from benzene, and melts at 93° C. The nitrogen content of the product obtained is 6.30%, whereas the calculated nitrogen content of beta-diethylaminoethyl acrylate hydrochloride is 6.70%.

B. Polymerization of the monomer: To a 10% aqueous solution of the beta-diethylaminoethyl acrylate hydrochloride prepared as described above is added powdered benzoyl peroxide (1% on the weight of monomer), and the solution heated at 100° C. for about 24 hours. The polymeric salt obtained has properties similar to those of beta-diethylaminoethyl methacrylate described in Example 2.

Example 9.—4 - (beta - methacrylyloxyethyl) morpholine. A. 4-(beta-hydroxyethyl) morpholine: Three hundred thirty grams of triethanolamine hydrochloride are pyrolyzed at 7 mm. pressure for approximately six and one-half hours at a gradually increasing temperature of from 204–280° C. during which time two hundred sixty-one grams of distillate are collected. The distillate is dissolved in 750 cc. of ethanol, to this solution is added 175 grams of a 56% aqueous potassium hydroxide solution, the mixture refluxed for approximately three hours, then cooled, and the precipitate filtered off. The precipitate is washed with ether, the ether extract combined with the filtrate, and the solvents removed from the filtrate by vacuum distillation through a fractionating column. The residual oil is taken up with an equal volume of ether and the solution shaken with potassium carbonate. The 4-(beta-hydroxyethyl) morpholine that separates is removed, dried with anhydrous magnesium sulfate, filtered, and the product is purified by distillation under reduced pressure. The fraction boiling at 89–96° C. at 6 mm. pressure amounts to 132 grams. It is identified as 4-(beta-hydroxyethyl) morpholine.

B. 4-(beta-methacrylyloxyethyl) morpholine: A solution of 83 grams (0.634 mol) of 4-(beta-hydroxyethyl) morpholine and 250 grams (2.5 mols) of methyl methacrylate in 300 grams of dry benzene containing 10 grams of p-phenylenediamine is fractionally distilled through a 48" fractionating column fitted with a distilling head arranged for controlled reflux until the moisture present in the reagents has been removed, then a solution of 2 grams of metallic sodium in 20 cc. of methanol is added dropwise over a period of three hours, during which time a benzene-methanol binary (B. P. 58° C.) is collected at the head of the column. The mixture is then allowed to stand overnight, filtered, the precipitate washed with ether, the solvent and excess methyl methacrylate removed by distillation thru a 30" column under reduced pressure, and the product recovered by distilling thru a short column under reduced pressure. The fraction boiling at 96–100° C. at 1 mm. pressure is collected and further treated to remove p-phenylenediamine. To this fraction is added 20 grams of acetic anhydride, the mixture allowed to stand for three hours at room temperature, filtered, and the precipitate washed on the filter with a small volume of ether. The washings and filtrate are combined, diluted with two volumes of water, the mixture thoroughly agitated for a few minutes, and the organic compound salted out with potassium carbonate. The oily material obtained is dissolved in an equal volume of ether, the solution dried over anhydrous magnesium sulphate, filtered, the drying agent washed with ether, and the washings and filtrate combined. The product is recovered by distilling off the ether under reduced pressure at room temperature, and is an almost colorless oil which analyzes 6.35% nitrogen as compared to 7.04% nitrogen for 4-(beta-methacrylyloxyethyl) morpholine. The monomeric ester thus obtained polymerizes spontaneously upon standing at room temperature to a tough, elastic resin which is insoluble in water and the common organic solvents.

C. Polymerization of monomer: To 72.4 grams of 4-(beta-methacrylyloxyethyl) morpholine is added 22.2 grams of 98% acetic acid, and the solution diluted with water to 10% monomer concentration. To this solution is added 0.7 gram of benzoyl peroxide, and the mixture placed in a 100° C. oven for 16 hours. The solution of polymer thus obtained is filtered, diluted with two volumes of water, and the resin precipitated by addition of a slight excess of sodium hydroxide solution. The free base polymer thus obtained is soluble in methanol, ethyl acetate, etc.

Films obtained by baking the polymeric salt at 100° C. are clear, tough, and are swollen but not dissolved by water.

Other methods may be employed for preparing the amino alcohol esters of the alpha substituted acrylic acids than those described in the examples. For instance, they may be made by reacting the amino alcohol or alkali metal alcoholate with the acyl halide, acid anhydride, or acid or by reaction of an ester with the acid anhydride. The acrylic acid esters are best prepared by reaction of acrylyl chloride with the appropriate alcoholates.

I generally prefer to synthesize these esters at as low temperature as practical in order to avoid decomposition or polymerization of reactants or products, but the time and temperature of reaction will vary both with the method of preparation and the nature of the reacting ingredients. In some cases it is advisable to synthesize in the presence of a polymerization inhibitor for the esters, and among suitable inhibitors are hydroquinone, para-phenylenediamine, pyrogallol, tannic acid, sulphur, selenium, cuprous chloride, benzidine, etc.

The amino alcohols used in the practice of this invention are tertiary amines containing one or more primary, secondary, or tertiary alcoholic hydroxyl groups. The amino nitrogen group may contain substituents selected from the class consisting of alkyl, aryl, aralkyl or cyclo-paraffin groups or may be a member of a ring which may be heterocyclic. Examples of suitable alcohols coming within the scope of the above definition include beta-diphenylaminoethanol, beta-di-n-propyl-aminoethanol, beta-di-isopropylaminoethanol, di-n-dodecylaminoethanol, gamma-diethylaminopropanol, delta-diethylaminobutanol, delta-dibutylaminobutanol, delta-di-isobutylaminobutanol, beta-di-isobutylaminoethanol, tri-ethanolamine, tributanolamine, tripropanolamine, tri-isobutanolamine, beta-(N-ethyl-N-cyclohexylamino) ethanol, 1-(beta-hydroxyethyl) decahydroquinoline, 4-(beta-hydroxyethyl) thiomorpholine; the dimethyl ether of triethanolamine, beta-hydroxy-beta'-dialkylaminodiethyl ethers and analogous compounds from tri- and tetra-ethylene glycol, triethanolamine diesters, 1-(beta-hydroxyethyl) piperazine, 1-(beta-hydroxyethyl) monoalkylpiperazines-2-hydroxy-4-alkylmorpholine, dimethyl glucamine, N-octyl-N-methylglucamine, and dialkylaminodeca- and tetrahydronaphthols.

The esters of this invention are derivatives of amino alcohols of the character hereinbefore defined, and acids of the general formula

where R may be hydrogen, alkyl, aryl, aralkyl, or a cycloparaffin or heterocyclic radical; examples of suitable acids coming within the scope of the above definition include, together with the methacrylic and acrylic acids of the examples, alpha-butylacrylic acid, alpha-ethyl acrylic acid, alpha-phenyl acrylic acid, alpha-isopropyl acrylic acid, alpha-hexyl acrylic acid, alpha-methylphenyl acrylic acid, alpha-methylcyclohexyl acrylic acid, alpha-cyclohexyl acrylic acid, etc. These various acids may be made if desired in accord with the processes disclosed in the articles by Mannich and Ganz, Ber. 55, 3486 (1922) and Blaise and Luttringer, Bull. Soc. Chim. 33, 760 (1905).

The proportion of catalyst for the polymerization of the salts may vary up to about 2%, based on the weight of the monomer taken, altho larger amounts may be used if desired. Generally, however, it is desirable to use about 1% of catalyst based on the monomer. The examples illustrate the use of benzoyl peroxide as the catalyst for the polymerization of the monomeric salts, but I do not wish to limit myself thereto as other catalysts such as barium peroxide, sodium peroxide, hydrogen peroxide, per-acetic acid and other per acids, ultra-violet light, or combinations of these, etc., may be used equally as well. The polymerization may also be carried out by heating without catalysts.

The acid salt of the amino alcohol esters of acrylic acid and of the alpha-substituted acrylic acids may be prepared by reacting the ester with an equivalent amount or with an excess of a suitable acid. Both inorganic and organic acids may be employed such, for example, as in addition to the acids given in the examples sulfuric acid, sulfurous acid, carbonic acid, phosphoric acid, fluosilicic acid, and as examples of suitable organic acids are included glycollic acid, lactic acid, formic acid, acrylic acid, methacrylic acid, chloracetic acid, para-toluene sulphonic acid, propionic acid, butyric acid, and the higher straight and branch chain aliphatic carboxylic acids, laevulinic acid, chloroisobutyric acid, adipic acid, succinic acid, phthalic acid, and the like. Generally speaking, however, it is preferable to employ a volatile organic acid for the reason that films comprising salts of non-volatile acids are not generally rendered insoluble by heat-treatment while, on the contrary, the salts of volatile acids are invariably converted to the relatively insoluble form by heat-treatment. The volatile acids which I have found to be particularly applicable to this important feature of the invention include acetic acid and carbonic acid. The unusual characteristics resulting from the polymerization of these monomers in carbon dioxide solution result from the fact that films flowed therefrom may be insolubilized by the simple evaporation of water.

The following examples illustrate additional methods of polymerization:

*Example 10.*—Beta-diethylaminoethyl methacrylate is suspended in ice cold water, carbon dioxide is passed into the suspension with stirring until solution is complete, 1% benzoyl peroxide (based on the weight of monomer taken) is then added to the solution, and the mixture exposed to ultra-violet light as 0–10° C. for 24 hours. The free base polymer may be obtained by heat-treatment of the solution to expel carbon dioxide.

The polymerization may also be carried out by placing the solution in an autoclave and heating at 100° C. for sufficient time to effect polymerization. In this case the polymerization may be carried out with or without catalysts.

*Example 11.*—Beta-dimethylaminoethyl methacrylate is suspended in water, the theoretical amount of fluosilicic acid is added slowly with stirring. The solution is diluted with water to 10% monomer concentration, benzoyl peroxide added (1% on the weight of monomer taken), and the mixture heated at 100° C. for 5 hours.

Highly useful interpolymers and co-polymers may be made by carrying out the polymerization of the salt of the ester in the presence of other polymerizable compounds, e. g. vinyl esters, styrene, indene, coumarone, chloro-2-butadiene-1-3, acrylic and methacrylic acids and derivatives thereof, etc., preferably in an organic solvent medium with or without the aid of a suitable polymerization catalyst. In some cases, however, it is advantageous to carry out the polymerization, interpolymerization or co-polymerization in a mixed aqueous-organic solvent medium.

The processes of this invention are capable of being operated either at room temperature or at elevated temperatures. When polymerization is effected at room temperature, I generally, prefer to use ultra-violet light in the presence of benzoyl peroxide as the polymerization catalyst, altho ultra-violet light alone may be used if desired. When polymerization is carried out at elevated temperature, say, about 100° C. I generally prefer to use a peroxide catalyst and to carry out the polymerization in a closed vessel.

As has already been indicated, polymerization may be effected either in an aqueous or organic solvent solution or by suspending or dissolving the monomeric salts in aqueous or organic solvent solutions. Usually, when polymerization is effected in an organic solvent medium I prefer to employ a solvent in which the monomeric salt is soluble, such, for example, as the lower aliphatic alcohols, the specific solvent to be selected, of course, being governed by the individual salt being polymerized.

If desired, the monomer may be highly dispersed or completely emulsified prior to polymerization. The dispersion is effected in the presence of a suitable dispersing agent and the polymerization while in this form is carried out in accord with the known methods for emulsion polymerization of analogous polymerizable compounds. Such procedures are disclosed in the British Patents 358,534 and 374,436, as well as in the copending application of Crawford et al. Ser. No. 749,500.

It has been emphasized that the free base polymers obtained by the spontaneous polymerization of monomeric amino alcohol esters of acrylic and of alpha substituted acrylic acids, at or below room temperature, and without a catalyst, are generally insoluble in dilute acids and organic solvents; moreover, it is difficult to polymerize the free base monomers in organic solutions. The outstanding advantages of the present invention are evidenced by the fact that many of the free base polymers obtained by the neutralization of the polymerized salts are soluble in dilute acids, such, for example, as hydrochloric acid, formic acid, acetic acid, and higher aliphatic monocarboxylic acids; aromatic hydrocarbon solvents, such as benzene, toluene; in mineral spirits; in the lower aliphatic alcohols, such as methanol, ethanol, propanol, and the like; in the ketones such as acetone, diethyl ketone; in the organic esters such as ethyl acetate, butyl acetate, methyl formate; in ethers such as ethylene glycol monomethyl ether; and in many other common organic solvents.

Polymeric salts, obtained in accordance with the processes of this invention are highly useful as dispersing agents for pigments; as emulsifying agents for oils, fats, waxes and rubber precursors such as 2-chloro-1,3-butadiene; as fixatives for pigments, waxes, and oils to paper, fabrics, and leather; as adhesives, especially for lamination of wood to wood; as ingredients of water paints, alone or in combination with oils, pigments, and waxes; as finishes for rubberized fabrics; and as sizes for improving the adhesion of moisture-proofing lacquers to thin transparent sheets of regenerated cellulose. Certain of the polymeric salts, particularly the fluosilicates and thiocyanates, are highly useful as insecticides and parasiticides. The fatty acid salts and rosin salts are especially useful in coating compositions.

The free base polymers produced in accordance with this invention are highly useful as adhesives, especially for laminating wood to wood; as stabilizers for gasoline and for the chlorine-containing substances mentioned above; as fixatives for pigments, oils, and waxes to paper, cloth and leather; as fixing agents for acid dyes; as ingredients of moisture-proofing lacquers; as sizing agents to improve the anchorage of moisture-proofing lacquers to thin transparent sheets of regenerated cellulose, and as ingredients of coating compositions, particularly in combination with nitrocellulose, ethyl cellulose, fatty oils, and polyhydric alcohol, polycarboxylic acid resins.

From a consideration of the specification it will be realized that many modifications may be made in the details therein given without departing from the scope of the invention as covered by the appended claims.

I claim:

1. Process which comprises converting to a water-soluble acid addition salt a monomeric ester of an alpha-alkyl-alpha-methylene monocarboxylic acid and an amino alcohol in which the amino group is tertiary, and subsequently polymerizing said salt.

2. Process which comprises converting to a water-soluble acid addition salt a monomeric methacrylic ester of an amino alcohol in which the amino group is tertiary, and subsequently polymerizing said salt.

3. Process which comprises reacting a monomeric ester of an alpha-methylene aliphatic monocarboxylic acid and an amino alcohol in which the amino group is tertiary, with an inorganic acid which will form a water-soluble addition salt of said ester, and subsequently polymerizing the resulting addition salt by heating it in the presence of a polymerization catalyst.

4. Process which comprises reacting a monomeric methacrylic ester of an amino alcohol in which the amino group is tertiary, with a volatile organic acid which will form a water-soluble addition salt of said ester, and subsequently polymerizing said salt.

5. Process which comprises reacting a monomeric methacrylic ester of an amino alcohol in which the amino group is tertiary, with acetic acid to form a water-soluble addition salt of said ester, and subsequently polymerizing said salt.

6. Process which comprises forming a water-soluble addition salt by passing carbon dioxide into an aqueous suspension of monomeric beta-diethyl-aminoethylmethacrylate, and subsequently polymerizing said salt.

7. Process which comprises reacting monomeric beta-diethylaminoethylmethacrylate with an acid which will form a water-soluble addition salt, and subsequently polymerizing said salt.

8. Process which comprises converting to a water-soluble acid addition salt a monomeric ester of an alpha-methylene aliphatic monocarboxylic acid and an amino alcohol in which the amino group is tertiary, polymerizing said salt, and subsequently converting the polymeric salt to the free-base polymer.

9. Process which comprises converting to a water-soluble acid addition salt a monomeric methacrylic ester of an amino alcohol in which the amino group is tertiary, polymerizing said salt, and subsequently converting said polymeric salt to the free-base polymer.

10. Process which comprises reacting a monomeric methacrylic ester of an amino alcohol in which the amino group is tertiary with a volatile organic acid which will form a water-soluble addition salt of said ester, polymerizing said salt, and subsequently converting said polymeric salt to the free-base polymer.

11. Process which comprises treating a monomeric methacrylic ester of an amino alcohol in which the amino group is tertiary with an approximately chemically equivalent amount of a volatile organic acid, dissolving the resulting amine-acid addition salt in an amount of water necessary to form a 5 to 30% aqueous solution of the salt, heating said aqueous solution until polymerization is effected, treating the polymeric salt with an alkaline-reacting compound, and isolating the resulting free-base polymer.

12. Process which comprises treating beta-diethylaminoethylmethacrylate with an approximately chemically equivalent amount of acetic acid, dissolving the resulting beta-diethylamino-ethylmethacrylate-acetic acid addition salt in an amount of water necessary to form an approximately 10% aqueous solution of the salt, adding approximately 1% (based on the monomer) of powdered benzoyl peroxide, heating said aqueous solution at approximately 100° C. until polymerization is effected, precipitating the polymeric salt by the addition of an equivalent amount of sodium bicarbonate and subsequently isolating the free-base polymer after heating the neutralized solution to approximately 100° C. to liberate the carbon dioxide.

13. Process which comprises passing carbon dioxide into an aqueous suspension of monomeric beta-diethylaminoethylmethacrylate, polymerizing the resulting monomeric carbonate, and thereafter expelling the carbon dioxide from the polymeric salt with heat to form the free-base polymer.

14. A polymeric acid addition salt of an ester of an alpha-methylene aliphatic monocarboxylic acid with an amino alcohol in which the amino group is tertiary.

15. A polymeric acid addition salt of a methacrylic ester of an amino alcohol in which the amino group is tertiary.

16. A polymeric addition salt of a carboxylic acid and a methacrylic ester of an amino alcohol in which the amino group is tertiary.

17. A polymeric addition salt of a carboxylic acid and beta-diethylaminoethylmethacrylate.

18. A soluble free-base polymer obtained as set forth in claim 8.

19. A soluble free-base polymer obtained as set forth in claim 9.

20. A soluble free-base polymer obtained as set forth in claim 12.

JESSE HARMON.